(12) United States Patent
Soderqvist (10) Patent No.: US 11,377,893 B2
(45) Date of Patent: Jul. 5, 2022

(54) CLOSING SPEED CONTROL IN POWER OFF

(71) Applicant: ASSA ABLOY ENTRANCE SYSTEMS AB, Landskrona (SE)

(72) Inventor: Sven-Gunnar Soderqvist, Vallakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 407 days.

(21) Appl. No.: 16/465,213

(22) PCT Filed: Dec. 20, 2017

(86) PCT No.: PCT/EP2017/083716
§ 371 (c)(1),
(2) Date: May 30, 2019

(87) PCT Pub. No.: WO2018/115063
PCT Pub. Date: Jun. 28, 2018

(65) Prior Publication Data
US 2019/0338578 A1    Nov. 7, 2019

(30) Foreign Application Priority Data
Dec. 22, 2016    (SE) .................................. 1630305-9

(51) Int. Cl.
*H02P 3/08* (2006.01)
*H02P 3/12* (2006.01)
(Continued)

(52) U.S. Cl.
CPC ............... *E05F 15/60* (2015.01); *E05F 1/10* (2013.01); *H02P 3/08* (2013.01); *H02P 3/12* (2013.01); *H02P 3/14* (2013.01); *E05Y 2900/132* (2013.01)

(58) Field of Classification Search
CPC .... E05F 15/60; E05F 1/10; E05F 3/18; H02P 3/08; H02P 3/12; H02P 3/14
See application file for complete search history.

(56) References Cited

U.S. PATENT DOCUMENTS 1,730,764 A * 10/1929 Green .................... H01H 9/102
337/188
4,727,679 A * 3/1988 Kornbrekke ............ E05F 15/63
49/138
(Continued)

FOREIGN PATENT DOCUMENTS

DE    2923025        11/1980
DE    2923025 A1 *  11/1980 ................ H02P 3/12
(Continued)

OTHER PUBLICATIONS

International Search Report and Written Opinion mailed in PCT/EP2017/083716 dated Mar. 21, 2018.
(Continued)

*Primary Examiner* — Thai T Dinh
(74) *Attorney, Agent, or Firm* — Wissing Miller LLP (57) ABSTRACT

A swing door operator for moving at least one door leaf between a first and a second position includes a motor and a mechanical drive unit connected to and capable of moving the at least one door leaf from the first position to the second position, and a braking circuit connected to the motor. The braking circuit includes a diode circuit arranged to apply a voltage drop to the motor. The motor is adapted to act as a generator and is configured to generate a voltage when the drive unit moves the at least one door leaf, and to brake a movement of the at least one door leaf when the voltage generated by the motor is larger than the voltage drop applied by the diode circuit. The diode circuit includes at least three diodes connected in series.

20 Claims, 6 Drawing Sheets

(51) Int. Cl.
*H02P 3/14* (2006.01)
*E05F 15/60* (2015.01)
*E05F 1/10* (2006.01)

(56) References Cited

U.S. PATENT DOCUMENTS

| | | | |
|---|---|---|---|
| 5,036,620 A * | 8/1991 | Beran | E05F 15/614 |
| | | | 49/141 |
| 8,248,005 B2 * | 8/2012 | Romer | H02P 3/12 |
| | | | 318/380 |
| 8,405,337 B2 * | 3/2013 | Gebhart | H02P 6/085 |
| | | | 49/506 |
| 9,163,446 B2 * | 10/2015 | Houser | E05F 15/74 |
| 10,221,609 B2 * | 3/2019 | Yulkowski | E05F 15/70 |
| 10,378,262 B2 * | 8/2019 | Yulkowski | E05F 15/70 |
| 2010/0320944 A1 | 12/2010 | Roemer | |
| 2018/0100343 A1 * | 4/2018 | Hughes | E05F 15/60 |

FOREIGN PATENT DOCUMENTS

| | | | | |
|---|---|---|---|---|
| DE | 4100335 | | 7/1992 | |
| EP | 0924848 | | 6/1999 | |
| WO | 2006133689 | | 12/2006 | |
| WO | WO-2006133689 A1 * | 12/2006 | | H02P 3/12 |

OTHER PUBLICATIONS

Search Report mailed in SE Application 1630305-9 dated Sep. 6, 2017.

* cited by examiner

CLOSING SPEED CONTROL IN POWER OFF

This application is a 371 of PCT/EP2017/083716 filed on Dec. 20, 2017, published on Jun. 28, 2018 under publication number WO 2018/115063, which claims priority benefits from Swedish Patent Application No. 1630305-9 filed on Dec. 22, 2016, the disclosure of which is incorporated herein by reference.

FIELD OF THE INVENTION

The present invention relates to a swing door operator in an emergency mode.

BACKGROUND OF THE INVENTION

Automatic door sets are regulated by standards, such as the European standard DIN 18263-4, which defines pedestrian protection requirements for door sets. These regulations define, e.g., maximum kinetic energy, maximum closing force, opening and closing time, opening and closing time for different parts of speed trajectory of a door and use of safety sensors. These regulations were created in order to minimise the risk of injuries to any individual located in the closing path of a door leaf during an emergency and/or during a power cut off and at the same time assure that the door leaf closes in an intended manner.

SUMMARY OF THE INVENTION

It is an object of the present invention to mitigate the above problems. A further object is to have an alternative solution to what is previously known. A further object of the present invention is to reduce the size and the cost of the swing door operator that is active in an emergency state and/or during a power cut off. A further object is a swing door operator for moving at least one door leaf between a first and a second position, comprising a motor and a mechanical drive unit adapted to be connected to and to move the at least one door leaf from the first to the second position and a braking circuit connected to the motor. The braking circuit comprise a diode circuit that is arranged to apply a voltage drop to the motor, the motor is adapted to act as a generator and to generate a voltage when the drive unit move the at least one door leaf and to brake the movement of the at least one door leaf when the generated voltage is larger than the applied voltage drop of the diode circuit, and the diode circuit comprise at least three diodes connected in series.

By using diodes connected series and connected to the motor a swing door operator is achieved which reduces the cost of the swing door operator and still can fulfill the standards. A further advantage is that the diodes do prevent the motor to function as a generator if the door leaf is moved in the opposite direction.

According to a first aspect of the present invention, these objects are achieved by a swing door operator wherein the diode circuit further comprise at least two short circuit positions connected to the series of diodes and wherein at least one of the diode is connected between two short circuit positions and the short circuit positions are adapted to be connected to an electrical bridge to short circuit two short circuit positions to alter the applied voltage drop of the diode circuit. The short circuit positions have the advantages that the braking circuit could alter when and how the motor should brake the axle and thus also the movement of the door leaf without changing any parts in the braking circuit. The short circuit position upholds a small space and has a low cost in view of other ways to change when the motor should brake the movement of the door leaf and still fulfill the requirements on the swing door operator.

According to one aspect the diode circuit may comprise at least one electrical bridge connected to two short circuit positions to short circuit at least one of the diodes in the series of connected diodes. The electrical bridge is an effective and reliable way of short circuit two short circuit positions to a low cost.

According to one aspect, the at least one electrical bridge may be adapted to be detachable connected to two short circuit positions, such that the voltage drop in the diode circuit could be altered many times. This could for instance be needed when a swing door operator is installed and the closing speed and time of the door leaf in a power off state should be set.

According to one aspect the diode circuit may comprise 4 or 6 short circuit positions, such that the braking circuit could be adapted to several types and sizes of door leafs and door sets.

According to one aspect the short circuit positions may be positioned in a grid pattern, which reduces the size of the diode circuit.

According to one aspect the grid pattern may be a rectangular grid pattern.

According to one aspect the short circuit positions may be positioned on the corners of the grid pattern to even further reduce the size of the diode circuit.

According to one aspect the diodes may be positioned on the diagonal between two short circuit positions and/or between two adjacent positioned short circuit positions. By positioning the diodes according to this a braking circuit could be achieved that are small in size compared to the number of diodes connected in series in the braking circuit and the flexibility to interact with a electrical bridge to alter the number of actively connected diodes and thus alter the voltage drop of the diode circuit.

According to one aspect the diodes may be positioned on two of the diagonals between two short circuit positions such that the serial connected diodes have an x-pattern between the short circuit positions.

According to one aspect the diode circuit may comprise 4, 6 or 8 diodes.

According to one aspect 1, 2 or 3 diodes may be located between two short circuit positions.

According to one aspect the diode circuit may comprise at least 4 short circuit positions and at least 4 diodes and one diode is positioned before the first short circuit position, at least one diode is located on the diagonal between the first and the second short circuit position, at least one diode is located between the second and third short circuit position and at least one diode is located on the diagonal between the third and the fourth short circuit position.

According to one aspect 2 or 3 diodes may be located on the diagonal between the first and the second short circuit position.

According to one aspect 2 or 3 diodes may be located between the second and third short circuit position.

According to one aspect 2 or 3 diodes are located on the diagonal between the third and the fourth short circuit position.

According to one aspect the diode circuit may comprise at 2, 3 or 4 electrical bridges each connected to two short circuit positions to alter the applied voltage drop of the diode circuit.

According to one aspect the swing door operator may comprise a circuit card adapted to be connected to two short circuit positions.

According to one aspect the circuit card may comprise a second braking circuit.

According to one aspect the braking circuit may comprise a lock kick adapted to disconnect the diode circuit dependent on the position of the at least one door leaf.

According to one aspect the drive unit may be a spring mechanism.

By using the door operator according to the above, the size and price of the braking circuit could be reduced.

Generally, all terms used in the claims are to be interpreted according to their ordinary meaning in the technical field, unless explicitly defined otherwise herein. All references to "a/an/the [element, device, component, means, etc.]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

This and other aspects of the present invention will now be described in more detail, with reference to the appended drawings showing currently preferred embodiments of the invention.

DETAILED DESCRIPTION

Aspects of the present disclosure will be described more fully hereinafter with reference to the accompanying figures. The assembly disclosed herein can, however, be realized in many different forms and should not be construed as being limited to the aspects set forth herein.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present invention relates to door operators for different types of door sets and door leafs. More specifically, the invention relates to door operators for a swing door set.

In FIGS. 1 to 5 a swing door operator 1 is disclosed that is connected to a door leaf 2 of a swing door set 3 and adapted to move the door leaf 2 from an first position O to a second position C and from a second position C to an first position O. In the disclosed embodiment the first position O is an open position O and the second position C is a closed position C. However, in some aspects the first position could be the closed position and the second position could be the open position.

A swing door set generally refers to a door set having one or two door leafs 2, i.e. a single leaf swing door set 3 or a double leaf swing door set 3, where each swing door leaf is hinged or pivoted to the door frame at one of its edges.

Figure 3:
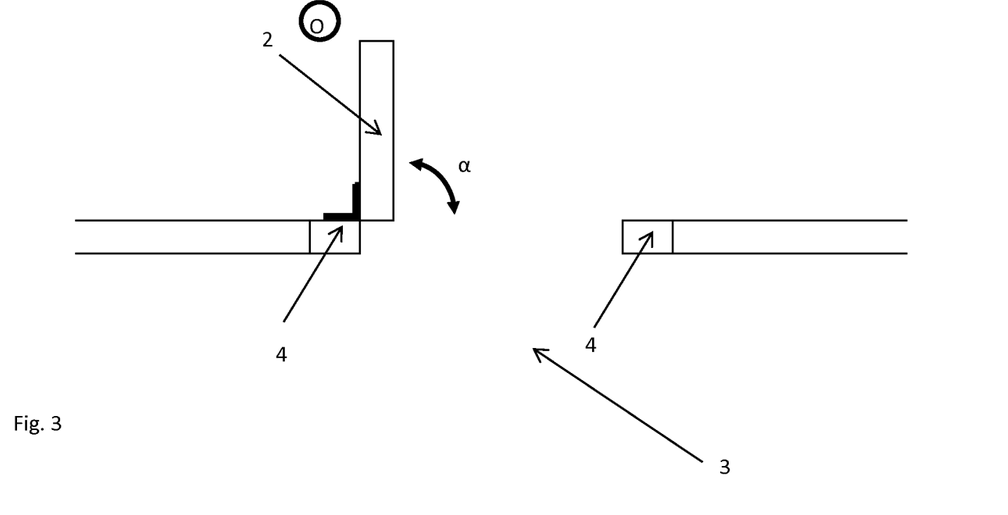
FIG. 3 shows a schematic top view of a swing door set with one door leaf, wherein the door leaf is arranged in an open position.

When the swing door set 3 is provided with only one door leaf 2, the swing door leaf 1 is hinged or pivoted at one edge to the door frame 4, while the main opening/closing edge 5 of the door leaf 2 closes against, and preferably locks with, the corresponding edge of the door frame 4.

Figure 4:
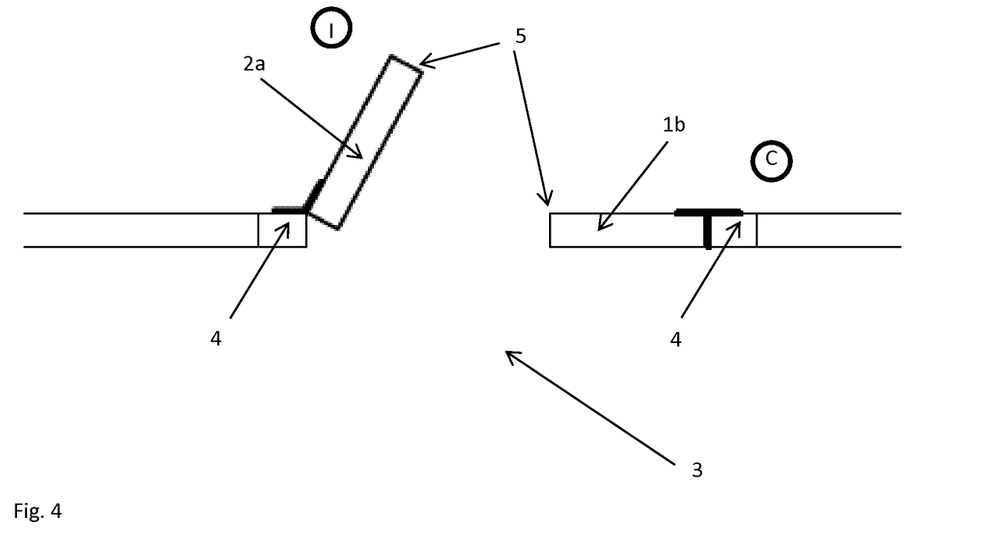
FIG. 4 shows a schematic top view of a swing door with two door leafs, wherein one door leaf is arranged in an intermediate position and one door leaf is arranged in a closed position.

When the swing door set 3 is provided with two swing door leafs 2, the swing door set 3 may comprise two identical swing door leafs 2a, b, arranged side by side with their respective opening/closing edges 3 in close proximity to each other when both door leafs 2a, b are in the closed position C.

Also, the swing door set 3 may comprise a master swing door leaf 2a, provided with a flange extending along its main opening/closing edge 3, and a slave door leaf 2b. The flange of the master door leaf 2a is adapted to protrude over the main opening/closing edge 3 of the slave door leaf 2b, when both door leafs 2a, 2b are in the closed position C. With such an arrangement, the door leafs 2a, 2b can be pushed open in one direction only, preferably from the inside of a room or building in a direction outwards towards the exterior, a corridor, or an evacuation route. The main opening/closing edge 5 of the master door leaf 2a closes against, and preferably locks into, an opposing opening/closing edge, i.e. the main opening/closing edge 5, of the slave door leaf 2b.

In a swing door set 3, the open position O means that the door leaf 2 is opened to an angle α of approximately 80-110° in relation to the surrounding walls, which is a common door opening angle during regular use. The closed position C means that the swing door leaf is arranged at a 0° angle, i.e. the door opening is completely closed by the door leaf 2.

A swing door set 3 comprises of at least one door leaf 2 and at least one door operator 1. The swing door set 3 preferably comprises of one of the following combinations: one door leaf 2 and one door operator 1, as shown in FIG. 1, or two swing door leafs 2a, 1b and two door operators 1, each door leaf 2a, 2b being connected to its own door operator 1, as shown in FIG. 4.

The door operator 1 is connected to the door leaf 2 and moves the door leaf 2 from its open position O to its closed position C and from its closed position C to its open position O.

Figure 1:
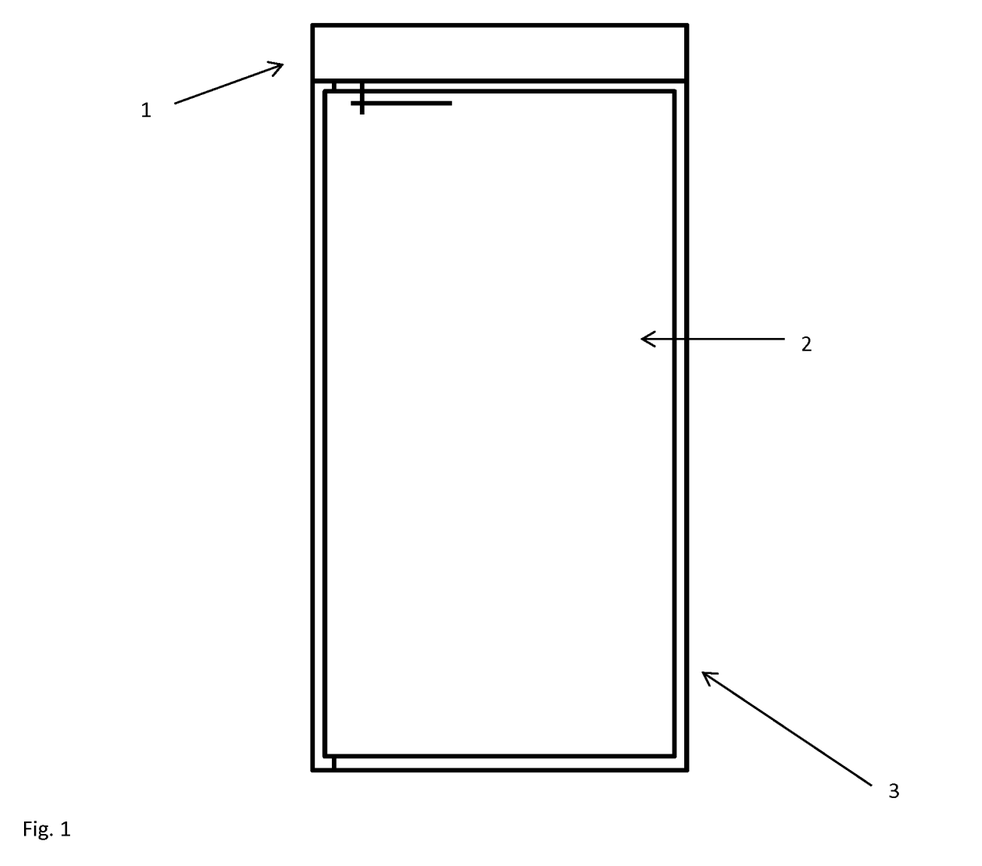
FIG. 1 discloses a swing door operator connected to a swing door set.
Figure 2:
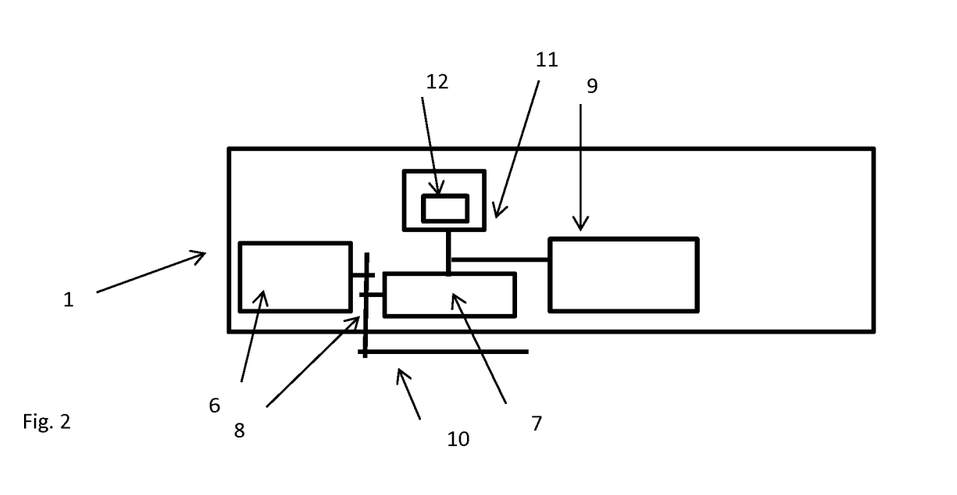
FIG. 2 disclose a schematic view of a swing door operator.
Figure 5:
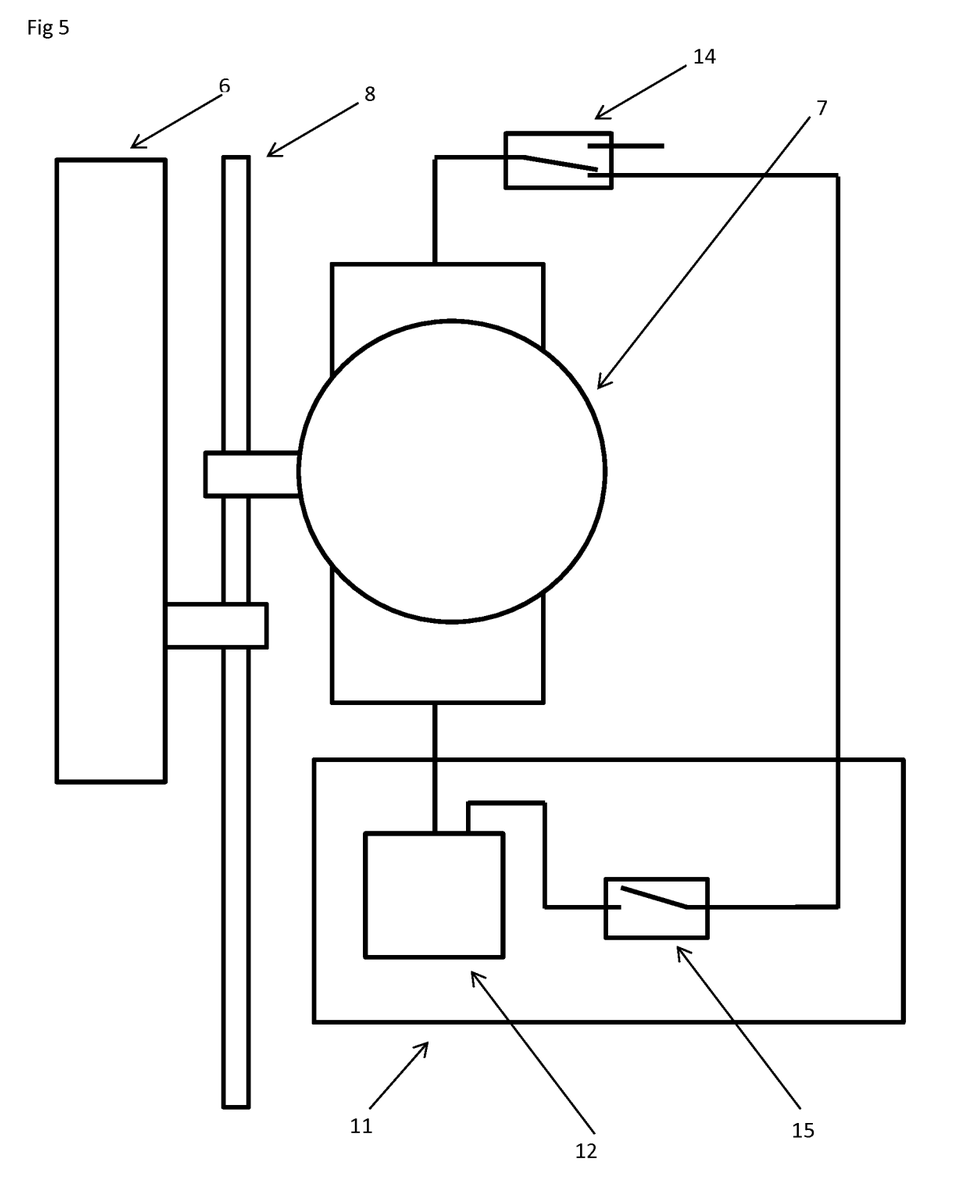
FIG. 5 shows a schematic view of a part of the swing door operator.

In FIGS. 1, 2 and 5 a swing door operator 1 is disclosed that comprise a motor 7, a drive unit 6, a braking circuit 11, an axle 8, a lever 10, a switch 14 and a control unit 9. The door operator 1 is connected to a door leaf 2 of a swing door set 3 and adapted to move the door leaf 2 from an open position O to a closed position C and from a closed position C to an open position O.

The drive unit 6 is connected to the axle 8. The drive unit 6 is a mechanical drive unit 6. The drive unit 6 is adapted to store energy from the movement of the axle 8 when it is moved in a second direction, i.e. when the door leaf 2 is moved from the second to the first position, and to use the stored energy to move the axle 8 in a first direction to move the door leaf from the first to the second position. The drive unit 6 may be a spring mechanism or any other mechanical unit that may store energy and be arranged to move the door leaf 2 between the first and second position. The drive unit 6 as such is well known in the art of swing door operators 1 that should function in the event that no power is applied to the swing door operator and will not be described in detail herein.

The motor 7 is a DC-motor. The motor 7 is connected to the axle 8 such that the axle 8 turns the motor 7 when the axle 8 is moved. When the drive unit 6 moves the axle 8, the axle 8 will move the motor 7. The motor 7 will act and function as a generator 7 when it is moved by the axle 8. The motor 7 could be a permanent magnetized motor 7 or a semi magnetized motor 7. When the motor 7 is run as a generator 7 it will generate a voltage that is proportional to the speed of the motor 7. The motor 7 is connected to the door leaf 2 via the axle 8 and the lever 10 and the generated voltage will thus also be proportional to the speed of the axle 8 and the speed of the door leaf 2. The motor 7 could comprise a gear box and be connected to the axle 8 via the gear box.

The braking circuit 11 is connected to the motor 7 and is adapted to set when and how the motor 7 should start braking the rotation of the axle 8, and thus also the movement of the door leaf when it is run as a generator 7.

The switch 14 is arranged to move between a first and a second position to set the swing door operator 1 in a first or a second operational mode. The switch 14 sets the swing door operator 1 in the first operational mode when the swing door operator 1 is plugged in to a power source and power is applied to the motor 7 of the swing door operator 1. The switch 14 sets the swing door operator 1 in the second operational mode when the swing door operator 1 is not connected to a power supply or when there is a power cut off in the power supply.

In the first operational mode, the motor 7 is connected to a power source and the value of the current applied to the motor 7 from the power source is controlled by the control unit 9. The motor 7 is connected to the door leaf 2 via the axle 8 and lever 10 and arranged to move the axle 8 and the lever 10. The motor 7 is connected to the control unit 9. The control unit 9 as such is well known in the art of door operators 1. The specific features of the connection between the control unit 9 and the motor 7 and the function of the swing door operator 1 in the first operational mode is well known and not described in detail in this application. The motor 7 may comprise a gear box, one or more cams and cam functions.

In the second operational mode, the switch 14 is in its second position and the motor 7 is electrically connected to the braking unit 11. In the second operational mode no power is connected to the motor 7 and the motor 7 acts as a generator 7. The second operational mode may be an emergency mode. If the door set 3 is a fire door, it is important that the door leaf 2 is closed with sufficient force to close the door and overcome a locking force of the door set 3 and at the same time not move to fast to injure any person that is located in the path of the door leaf.

When the door leaf 2 is in its first position O, the drive unit 6 exerts a torque on and moves the axle 8, lever 10 and the door leaf 2 from the first position O towards the second position C. The axle 8 is moved by the drive unit 6 and as the axle 8 is connected to the motor 7 The motor 7 will be moved by the axle 8 and act as a generator 7. When the motor 7 is moved and generates a voltage that is larger than a voltage drop set in the braking circuit 11, the motor 7 brakes the movement of the axle 8, and thus also the movement of a door leaf 2 connected to the axle 8 and the lever 10 will be braked. The braking circuit 11 comprise a diode circuit 12 and a lock kick 15. The diode circuit 12 comprise at least 3 diodes 13 connected in series. The diode circuit 12 is connected to the motor 7 and the voltage drop of the diode circuit 12 is applied to the motor 7. When the motor 7 is run as a generator 7 it will generate a voltage that is proportional to its speed. When the generated voltage is larger than the voltage drop of the diode circuit 12, the applied voltage drop is overcomed and current will run through the diode circuit 12 and the motor 7 will start applying a braking torque on the axle 8 to brake the movement of the door leaf 2. The voltage drop of the diode circuit 12 is the sum of the voltage drop of each diode 13 in the diode circuit 12. The voltage drop of the diode 13 is the forward voltage drop of the diode 13. The more diodes 13 that are actively connected in the diode circuit 12 the larger the voltage drop of the diode circuit will be. If the voltage drop of diode circuit 12 is increased, the voltage that the motor 7 has to generate before it starts braking the axle 8 and the door leaf 2 is increased. The time that the drive unit 6 could move the axle 8 and the door leaf 2 before the motor 7 start braking is increased. The time that it takes for the drive unit 6 to move the door leaf 2 decreases when the voltage drop of the diode circuit increases.

The motor 7 will exert a braking force on the axle 8 and reduce the speed of the axle 8 and thus also reduce the speed of the door leaf 2. The braking force of the motor 7 is proportional to the voltage of the generator 7 and the voltage drop applied to the motor 7. The braking torque of the motor 7 applied to the axle 8 is proportional to the speed of the motor 7. The braking torque and during which period that it should be applied to the axle 8 to reduce the speed of the axle 8 and thus also the door leaf 2 depend on the type of door leaf 2 that the swing door operator 1 is connected to and in the position of the door leaf 2, if it is part of an emergency exit route or if it is a fire door etc.

The lock kick 15 and the diode circuit 11 are connected in series in the braking circuit 11. The lock kick 15 is connected to a micro switch (not disclosed) and arranged to be activated if the opening angle of the door leaf 2 is below a predefined angle and to disconnect the braking circuit 11 from the motor 7. When the braking circuit 11 is disconnected from the motor 7, the motor 7 will stop applying a braking torque on the axle 8 and the speed of the door leaf 2 driven by that drive unit 6 will increase to assure that the door leaf 2 is closed in an intended way. The lock kick 15 as such is known in the art and will not be described in more detail herein.

The voltage drop applied to the motor 7 is the voltage drop of the braking circuit 11. The major part of the voltage drop of the braking circuit 11 is the voltage drop of the diode circuit 12. The voltage drop of the diode circuit 12 is the voltage drop of the part of the diode circuit 12 that is actively connected in the braking circuit 11. By actively connected is meant the part of the diode circuit 12 that will be electrically connected and active when the motor 7 is run as a generator 7.

The diode circuit 12 comprise diodes 13 and short circuit positions 16a-d, 20a-f. The diode circuit 12 may also comprise at least one electrical bridge 17. The electrical bridge 17 can be detachably connected to two short circuit positions 16a-d, 20a-f and short circuit said two short circuit positions 16a-d, 20a-f.

The connection between the short circuit positions 16a-d, 20a-f and the electrical bridge 17 could be a plug and socket connection. The plug and socket connection could be detachable connected. The short circuit positions 16a-d, 20a-f could be a socket. The electrical bridge 17 could comprise two plugs.

Figure 6A:
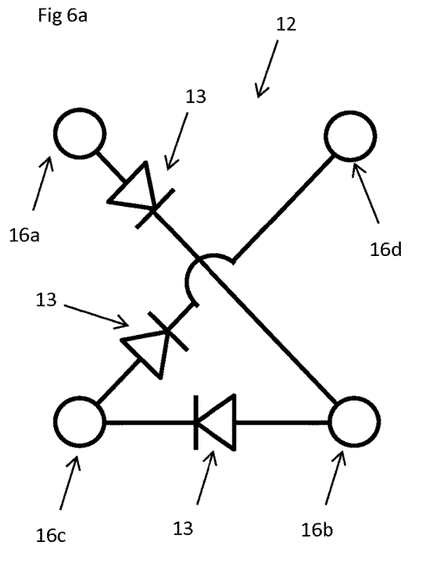
FIG. 6a shows a schematic view of a diode circuit comprising 4 short circuit positions and 3 diodes.
Figure 6B:
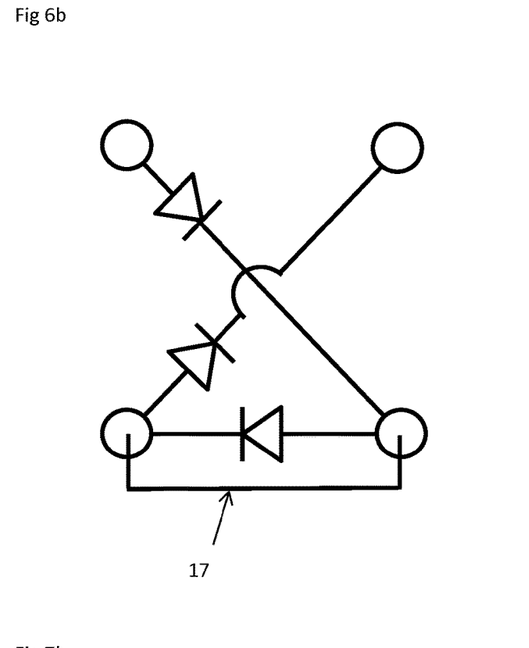
FIG. 6b shows a schematic view of the diode circuit in FIG. 6a further comprising an electrical bridge.

In FIGS. 6a and 6b a diode circuit 12 according to a first aspect is disclosed. The diode circuit 12 comprise 3 diodes and 4 short circuit positions 16a-d. The short circuit positions 16a-d is located in a grid pattern. The short circuit positions 16a-d is located in the corners of the grid, i.e. in the corners of a rectangle or a square. A first diode 13 is located on the diagonal between two short circuit positions 16a, 16b and connected to said short circuit positions 16a, 16b. A second diode 13 is located between two adjacent short circuit positions 16b, 16c, wherein one of the short circuit positions 16b is connected to the first diode 13, and connected to said short circuit positions 16b, 16c. A third diode 13 is located on the diagonal between two of the short circuit positions 16c, 16d, wherein one of the short circuit positions 16c is connected to the second diode 13, and connected to said short circuit positions 16a, 16b. The diodes 13 and the short circuit positions 16a-d are connected in series. When no electrical bridge 17 is connected in the braking circuit 12 the voltage drop of the braking circuit 12 is the voltage drop of the 3 diodes 13, as disclosed in FIG. 6a. The braking circuit 12 may comprise an electrical bridge 17 as disclosed in FIG. 6b. The electrical bridge 17 can be detachably connected to two short circuit positions 16a-d that is connected to a diode 13 to short circuit the two short circuit positions 16a-d. When two short circuit positions 16a-f that is connected to a diode 13 is short circuit, the diode 13 connected to said two short circuit position is short circuit and not actively connected in the series of diodes 13. In FIG. 6b the electrical bridge 17 is connected to the second and third short circuit positions 16b, 16c in the series. The electrical bridge 17 will short circuit the second diode 13 in the series and the voltage drop applied to the motor 7 from the diode circuit 12 will be the voltage drop of 2 diodes 13.

If the electrical bridge 17 is connected to the first and third short circuit positions 16a, 16c in the series, the first and third short circuit positions 16a, 16c are short circuit. The electrical bridge 17 short circuit the first and second diode 13 in the series and the voltage drop applied to the motor 7 from the diode circuit 12 will be the voltage drop of 1 diode 13.

The electrical bridge 17 could thus be connected in different ways to the short circuit positions 16a-d and change the voltage drop applied to the motor 7 from the diode circuit 12 between 0, 1, 2 or 3 diodes 13. If 0 diodes 13 actively connected to the motor 7, the voltage drop of the diode circuit 12 applied to the motor 7 is 0 and the motor 7 will start braking the movement of the axle 8 and the door leaf 2 as soon as it start generating a voltage. If 3 diodes 13 actively connected to the motor 7, the voltage drop of the diode circuit 12 applied to the motor 7 is the voltage drop of 3 diodes and the motor 7 will start braking the movement of the axle 8 and the door leaf 2 as soon as it generates a voltage that is larger than the voltage drop. The electrical bridge 17 is detachably connected to the short circuit positions 16a-d and the voltage drop of one diode circuit 12 could be altered and different voltage drops could be tested to find the optimal voltage drop from the diode circuit 12 in a specific installation.

Figure 7A:
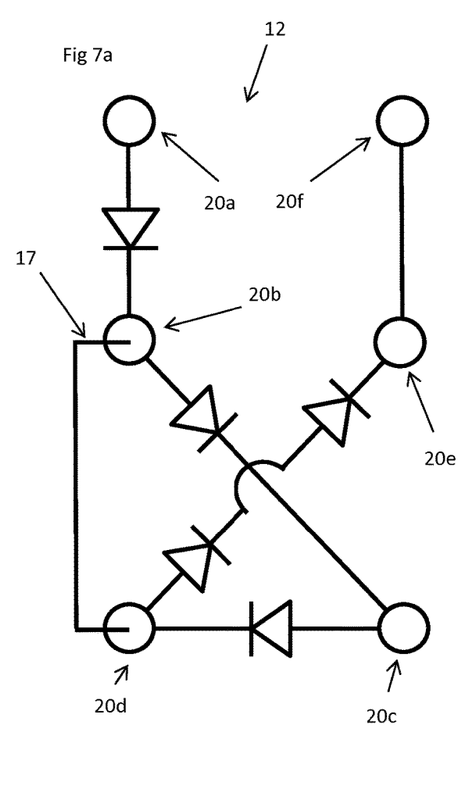
FIG. 7a shows a schematic view of a diode circuit comprising 6 short circuit positions, 5 diodes and one electrical bridge.
Figure 7B:
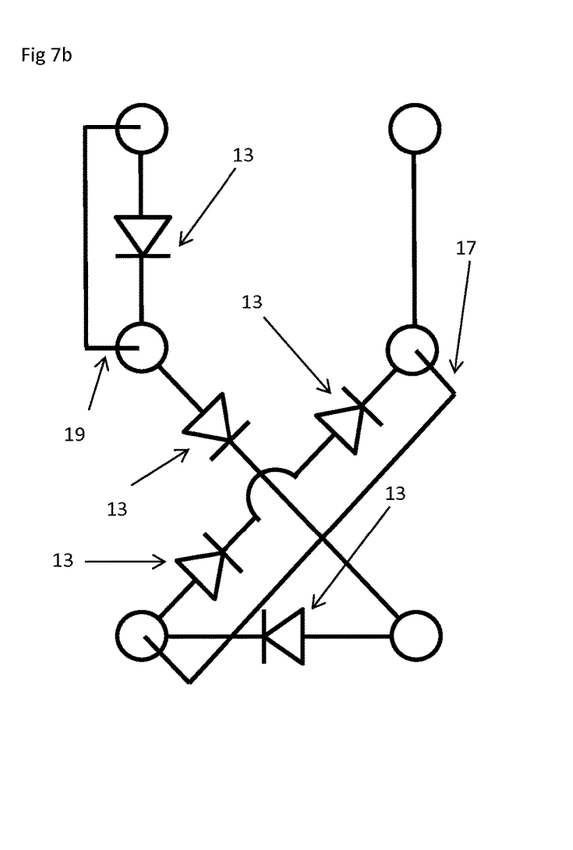
FIG. 7b shows a schematic view of the diode circuit in FIG. 7a comprising two electrical bridges.

In FIGS. 7a and 7b a diode circuit 12 according to an aspect is disclosed. The diode circuit 12 comprise 5 diodes and 6 short circuit positions 20a-f. The short circuit positions 20a-f is located in a grid pattern. The short circuit positions 20a-f is located in the corners of the grid, i.e. in the corners of 2 rectangles on top of each other. Another way of describing the positions of the short circuit positions 20a-f is that they are positioned in 2 parallel rows of 3.

A first diode 13 is located between two adjacent short circuit positions 20a, 20b and connected to said short circuit positions 20a, 20b. A second diode 13 is located on the diagonal between two of the short circuit positions 20b, 20c, wherein one of the short circuit positions 20b is connected to the first diode 13, and connected to said short circuit positions 20b, 20c. A third diode 13 is located between two adjacent short circuit positions 20c, 20d, wherein one of the short circuit positions 20c is connected to the second diode 13, and connected to said short circuit positions 20c, 20d. A fourth and a fifth diode 13 is located on the diagonal between two of the short circuit positions 20d, 20e, wherein one of the short circuit positions 20d is connected to the third diode 13, and connected to said short circuit positions 20d, 20e. The short circuit position 20e is connected to the fifth diode 13 connected to an adjacent short circuit position 20f that is not directly connected to a diode 13. The 5 diodes 13 and the 6 short circuit positions 20a-f are connected in series in a pattern that comprise an x-shape.

When no electrical bridge 17 is connected in the braking circuit 12, the voltage drop of the braking circuit 12 is the voltage drop of the 5 diodes 13.

In FIG. 7a a diode circuit 12 is disclosed comprising one electrical bridge 17 connected to the second and fourth short circuit positions 20b, 20d in the series. The electrical bridge 17 short circuit the second and third diode 13 in the series and the voltage drop applied to the motor 7 from the diode circuit 12 will be the voltage drop of 3 diodes 13.

In FIG. 7b a diode circuit 12 is disclosed comprising two electrical bridges 17. The first electrical bridge 17 is connected to the first and second short circuit positions 20a, 20b in the series. The first electrical bridge 17 short circuits the first diode 13 in the series. The second electrical bridge 17 is connected to the fourth and fifth short circuit positions 20d, 20e in the series. The second electrical bridge 17 short circuits the fourth and fifth diode 13 in the series. The voltage drop applied to the motor 7 from the diode circuit 12 will be the voltage drop of 2 diodes 13.

If an electrical bridge 17 is connected to the second and fifth short circuit position 20c, 20e, the third, fourth and fifth diode 13 in the series will be short circuit and the voltage drop applied to the motor 7 from the diode circuit 12 will be the voltage drop of 1 diode 13.

If an electrical bridge 17 is connected to the first and second short circuit position 20a, 20b, the first diode 13 in the series will be short circuit and the resistance applied to the motor 7 from the diode circuit 12 will be the voltage drop of 4 diodes 13.

One or two electrical bridges 17 could thus be connected in different ways to the short circuit positions 20a-f and change the voltage drop applied to the motor 7 from the diode circuit 12 between 0, 1, 2, 3, 4 or 5 diodes 13. The electrical bridges 17 are detachably connected to the short circuit positions 20a-f and the voltage drop of one diode circuit 12 could be altered and different voltage drops could be tested to find the optimal voltage drop from the diode circuit 12 in a specific installation.

Figure 8A:
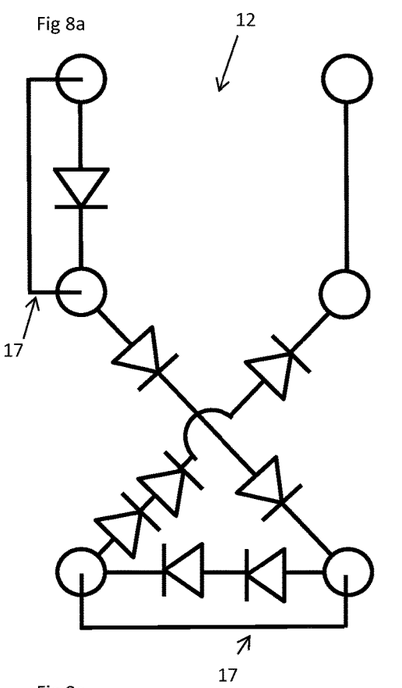
FIG. 8a shows a schematic view of a diode circuit comprising 6 short circuit positions, 8 diodes and two electrical bridges.
Figure 8B:
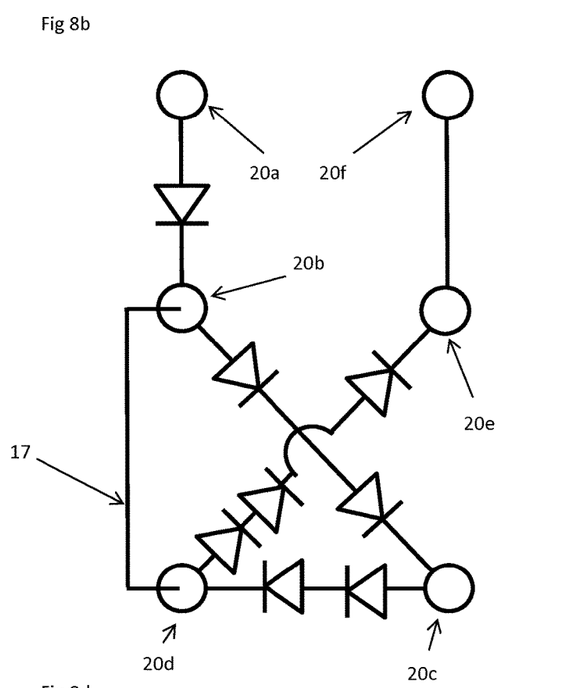
FIG. 8b shows a schematic view of the diode circuit in FIG. 8a comprising one electrical bridge.
Figures 8C, 8D:
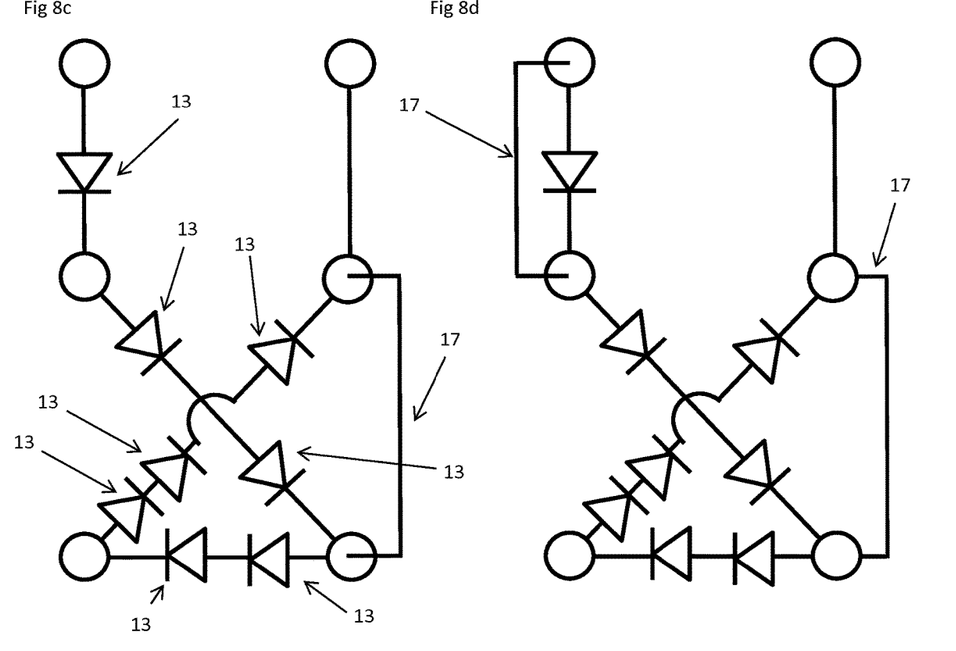
FIG. 8c shows a schematic view of the diode circuit in FIG. 8a comprising one electrical bridge.
FIG. 8d shows a schematic view of the diode circuit in FIG. 8a comprising two electrical bridges.

In FIGS. 8a and 8d a diode circuit 12 according to an aspect is disclosed. The diode circuit 12 comprise 8 diodes and 6 short circuit positions 20a-f. The short circuit positions 20a-f is located in a grid pattern in accordance with the disclosed diode circuit 12 in FIGS. 7a and 7b.

A first diode 13 is located between two adjacent short circuit positions 20a, 20b and connected to said short circuit positions 20a, 20b. A second and third diode 13 is located on the diagonal between two of the short circuit positions 20b, 20c, wherein one of the short circuit positions 20b is connected to the first diode 13, and connected to said short circuit positions 20b, 20c. A fourth and fifth diode 13 are located between two adjacent short circuit positions 20c, 20d, wherein one of the short circuit positions 20c is connected to the second and third diode 13, and connected to said short circuit positions 20c, 20d. A sixth, seventh and a eight diode 13 are located on the diagonal between two of the short circuit positions 20d, 20e, wherein one of the short circuit positions 20d is connected to the fourth and fifth diode 13, and connected to said short circuit positions 20d, 20e. The short circuit position 20e connected to the sixth, seventh and an eight diode 13 is connected to an adjacent short circuit position 20f that not is directly connected to a diode 13. The 8 diodes 13 and the 6 short circuit positions 20a-f are connected in series in a pattern that comprise an x-shape.

When no electrical bridge 17 is connected in the braking circuit 12, the voltage drop of the braking circuit 12 is the voltage drop of the 8 diodes 13.

In FIG. 8a a diode circuit 12 is disclosed comprising two electrical bridges 17. The first electrical bridge 17 is connected to the first and second short circuit positions 20a, 20b in the series. The first electrical bridge 17 short circuits the first diode 13 in the series. The second electrical bridge 17 is connected to the third and fourth short circuit positions 20d, 20e in the series. The second electrical bridge 17 short circuits the fourth and fifth diode 13 in the series. The voltage drop applied to the motor 7 from the diode circuit 12 will be the voltage drop of 5 diodes 13.

In FIG. 8b a diode circuit 12 is disclosed comprising one electrical bridge 17 connected to the second and fourth short circuit positions 20b, 20d in the series. The electrical bridge 17 short circuit the second, third, fourth and fifth diode 13 in the series and the voltage drop applied to the motor 7 from the diode circuit 12 will be the voltage drop of 4 diodes 13.

In FIG. 8c a diode circuit 12 is disclosed comprising one electrical bridge 17 connected to the third and sixth short circuit positions 20b, 20d in the series. The electrical bridge 17 short circuit the fourth, fifth, sixth, seventh and eight diode 13 in the series and the voltage drop applied to the motor 7 from the diode circuit 12 will be the voltage drop of 3 diodes 13.

In FIG. 8d a diode circuit 12 is disclosed comprising two electrical bridges 17. The first electrical bridge 17 is connected to the first and second short circuit positions 20a, 20b in the series. The first electrical bridge 17 short circuits the first diode 13 in the series. The second electrical bridge 17 is connected to the third and sixth short circuit positions 20b, 20d in the series. The second electrical bridge 17 short circuit the fourth, fifth, sixth, seventh and eight diode 13 in the series. The voltage drop applied to the motor 7 from the diode circuit 12 will be the voltage drop of 2 diodes 13.

If an electrical bridge 17 is connected to the second and fifth short circuit position 20c, 20e, the second, third, fourth, fifth, sixth, seventh and eight diode 13 in the series will be short circuit and the voltage drop applied to the motor 7 from the diode circuit 12 will be the voltage drop of 1 diode 13.

If an electrical bridge 17 is connected to the first and second short circuit position 20a, 20b, the first diode 13 in the series will be short circuit and the voltage drop applied to the motor 7 from the diode circuit 12 will be the voltage drop of 7 diodes 13.

One or two electrical bridges 17 could thus be connected in different ways to the short circuit positions 20a-f and change the voltage drop applied to the motor 7 from the diode circuit 12 between 0, 1, 2, 3, 4, 5, 6, 7 or 8 diodes 13. The electrical bridges 17 are detachably connected to the short circuit positions 20a-f and the voltage drop of one diode circuit 12 could be altered and different voltage drops could be tested to find the optimal voltage drop from the diode circuit 12 in a specific installation.

Figure 9:
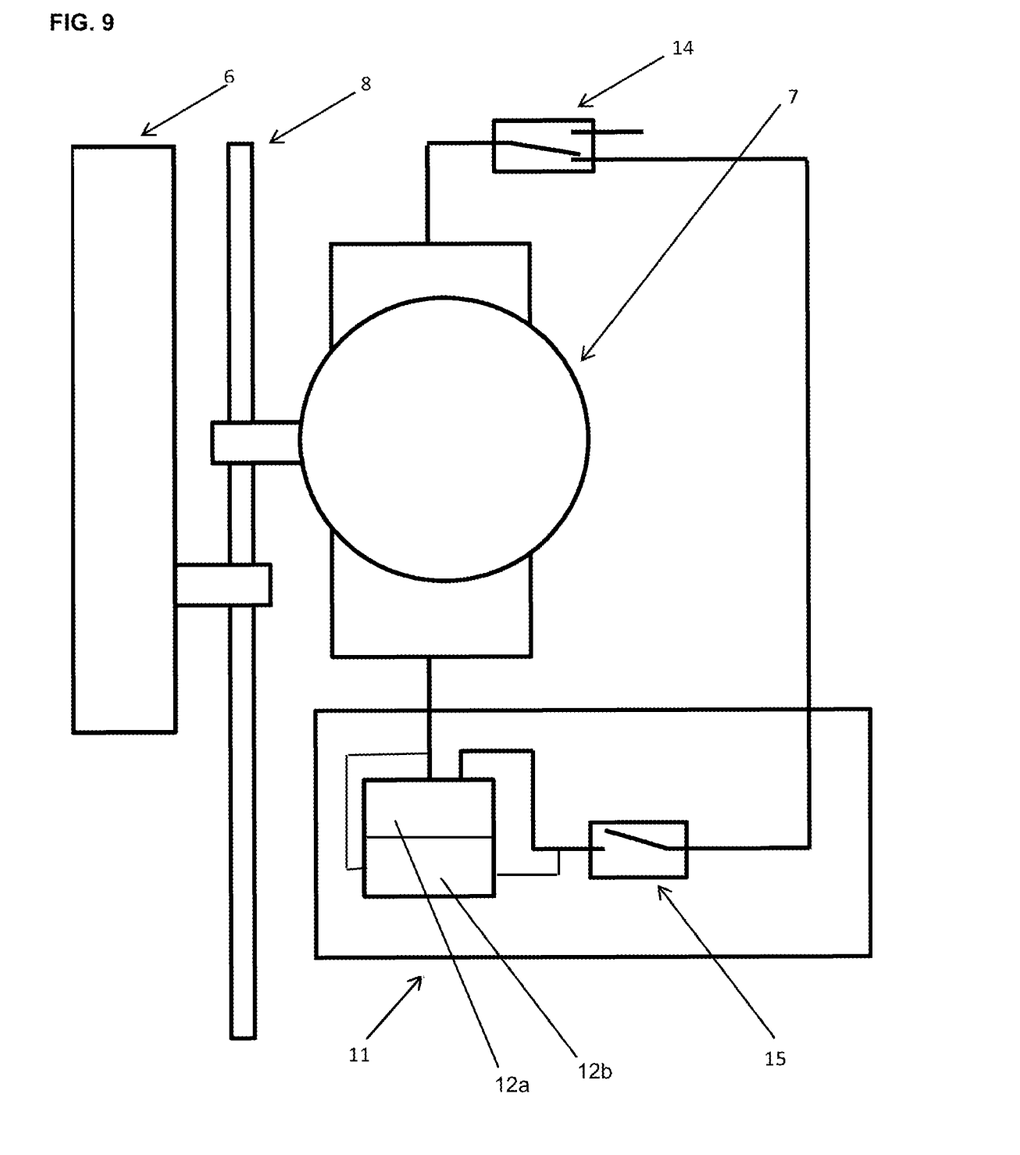
FIG. 9 shows a schematic view of a part of the swing door operator according to a further embodiment of the disclosure.

According to one aspect, as shown in FIG. 9, the braking circuit 11 further comprise a second diode circuit 12(b), which may be a circuit card. The second diode circuit (12b) could be a second braking circuit with an alternative voltage drop or a reverse braking circuit. The second diode circuit 12(b) could be connected to two short circuit positions 16a-d, 20a-f to alter the function and/or features of the diode circuit 12(a). The second diode circuit 12(b) may be connected to two short circuit positions 16a-d, 20a-f and disconnect the diode circuit 12(a).

The footprint of the diode circuit 12 disclosed in FIGS. 6-8 in the swing door operator 1 is small in relation to the number of different voltage drops that could be applied to the motor 7 from one braking circuit 11. The cost of the diode circuit 12 is low in relation to the flexibility of different voltage drops that could be achieved by altering the positions of the electrical bridges 17.

By voltage drop is meant the voltage that has to be overcome before a current starts running through the diode.

When the swing door operator 1 is installed in a building there are a number of parameters that are set in the swing door operator 1. One of the parameters that has to be set are the braking force that the motor 7 should apply to the axle 8 to brake the movement of the axle 8 when it is moved by the drive unit 6 and function as a generator 7. The braking force is set such that the speed of the door leaf 2 is within a predefined and desired speed. The braking force is set by connecting one or more electrical bridges 17 to two short circuit positions 16a-d, 20a-f in the diode circuit 12.

The person skilled in the art realizes that the present invention by no means is limited to the preferred embodiments described above. On the contrary, many modifications and variations are possible within the scope of the appended claims. For example, a sliding door set may comprise of more than two sliding door leafs, arranged in the same way as discussed above.

1 Swing door operator
2 Door leaf
3 Swing door set
4 Door frame
5 Main opening/closing edge 6 Drive unit
7 Motor
8 Axle
9 Control unit
10 Lever
11 Braking circuit
12 Diode circuit
13 Diode
14 Switch
15 Lock kick
16, 20 Short circuit positions
17 Electrical bridge

The invention claimed is:

1. A swing door operator for moving at least one door leaf between a first and a second position, the swing door operator comprising:
   a motor and a mechanical drive unit adapted to be connected to and move the at least one door leaf from the first to the second position; and
   a braking circuit connected to the motor;
   wherein the braking circuit comprises a diode circuit arranged to apply a voltage drop to the motor, the diode circuit having a plurality of short circuit positions connected to a series of diodes and an electrical bridge detachably connectable via a plug and socket connection to a selected pair of the plurality of short circuit positions so as to short circuit the selected pair of the short circuit positions to alter the voltage drop applied by the diode circuit;
   wherein the motor is adapted to act as a generator and configured to:
      generate a voltage when the drive unit moves the at least one door leaf; and
      brake a movement of the at least one door leaf when the voltage generated by the motor is larger than the voltage drop applied by the diode circuit;
   wherein the diode circuit comprises at least three diodes connected in series; and
   wherein at least one of the diodes is connected between a pair of the short circuit positions,
   wherein the short circuit positions are configured as sockets and the electrical bridge comprises two plugs configured to form the plug and socket connection between the electrical bridge and two short circuit positions.

2. The swing door operator according to claim 1, wherein the electrical bridge connected to the two short circuit positions is configured to short circuit at least one of the diodes in the series of connected diodes.

3. The swing door operator according to claim 2, wherein the diode circuit includes a pair of electrical bridges and at least two plug and socket connection, wherein each electrical bridge is detachably connected via a one of the at least two plug and socket connections to a different pair of the short circuit positions to alter the voltage drop applied to the motor by the diode circuit.

4. The swing door operator according to claim 1, wherein the diode circuit comprises four or six short circuit positions.

5. The swing door operator according to claim 1, wherein the short circuit positions are positioned in a grid pattern.

6. The swing door operator according to claim 5, wherein the grid pattern is a rectangular grid pattern.

7. The swing door operator according to claim 5, wherein the short circuit positions are positioned in corners of the grid pattern.

8. The swing door operator according to claim 5, wherein the at least one of the diodes is positioned on a diagonal between the two short circuit positions and between two adjacently positioned short circuit positions.

9. The swing door operator according to claim 5, wherein two diodes are positioned on two diagonals between respective two short circuit positions such that the two diodes have an x-pattern between the respective two short circuit positions.

10. The swing door operator according to claim 1, wherein the diode circuit comprises four, six or eight diodes.

11. The swing door operator according to claim 1, wherein one, two or three diodes are located between the pair of short circuit positions.

12. The swing door operator according to claim 1, wherein the diode circuit comprises at least four short circuit positions and at least four diodes, wherein one diode is positioned before a first short circuit position, wherein at least one diode is located on a diagonal between the first and a second short circuit position, wherein at least one diode is located between the second and a third short circuit position, and wherein at least one diode is located on a diagonal between the third and a fourth short circuit position.

13. The swing door operator according to claim 12, wherein two or three diodes are located on the diagonal between the first and the second short circuit position.

14. The swing door operator according to claim 12, wherein two or three diodes are located between the second and third short circuit position.

15. The swing door operator according to claim 12, wherein two or three diodes are located on the diagonal between the third and the fourth short circuit position.

16. The swing door operator according to claim 1, wherein the diode circuit comprises at least two, three or four electrical bridges each connected to two short circuit positions to alter the voltage drop applied by the diode circuit.

17. The swing door operator according to claim 1 further comprising a circuit card connectable to two short circuit positions of the plurality of short circuit positions.

18. The swing door operator according to claim 17, wherein the circuit card comprises a second braking circuit.

19. The swing door operator according to claim 1, wherein the braking circuit comprises a lock kick adapted to disconnect the diode circuit based on a position of the at least one door leaf.

20. The swing door operator according to claim 1, wherein the drive unit is a spring mechanism.

* * * * *